United States Patent
You et al.

(10) Patent No.: US 10,749,648 B2
(45) Date of Patent: Aug. 18, 2020

(54) METHOD AND USER EQUIPMENT FOR RECEIVING DOWNLINK SIGNAL, AND METHOD AND BASE STATION FOR TRANSMITTING DOWNLINK SIGNAL

(71) Applicant: LG ELECTRONICS INC., Seoul (KR)

(72) Inventors: Hyangsun You, Seoul (KR); Yunjung Yi, Seoul (KR); Bonghoe Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 95 days.

(21) Appl. No.: 15/744,310

(22) PCT Filed: Jul. 13, 2016

(86) PCT No.: PCT/KR2016/007595
§ 371 (c)(1),
(2) Date: Jan. 12, 2018

(87) PCT Pub. No.: WO2017/010798
PCT Pub. Date: Jan. 19, 2017

(65) Prior Publication Data
US 2018/0205512 A1    Jul. 19, 2018

Related U.S. Application Data

(60) Provisional application No. 62/192,539, filed on Jul. 14, 2015, provisional application No. 62/207,932, filed on Aug. 21, 2015.

(51) Int. Cl.
*H04L 5/00* (2006.01)
*H04W 4/70* (2018.01)
(Continued)

(52) U.S. Cl.
CPC .......... *H04L 5/0044* (2013.01); *H04L 5/0048* (2013.01); *H04L 5/0053* (2013.01);
(Continued)

(58) Field of Classification Search
CPC ....... H04L 5/0044; H04L 5/0048; H04W 4/70
See application file for complete search history.

(56) References Cited

U.S. PATENT DOCUMENTS

2010/0246518 A1    9/2010  Gheorghiu et al.
2016/0183231 A1*   6/2016  Shi ................... H04W 72/0406
                                                            370/329
(Continued)

FOREIGN PATENT DOCUMENTS

CN    102057589 A    5/2011
CN    104349458 A    2/2015
(Continued)

OTHER PUBLICATIONS

Ericsson, "ON PDCCH/EPDCCH mapping for enhanced coverage MTC UE", 3GPP TSG RAN WG1 Meeting #76, Feb. 2014 (Year: 2014).*

(Continued)

*Primary Examiner* — Siming Liu
(74) *Attorney, Agent, or Firm* — Birch, Stewart, Kolasch & Birch, LLP

(57) ABSTRACT

Provided is a device and method for transmitting or receiving an uplink channel or a downlink channel. In a wireless communication system, a user equipment: receives a physical downlink control channel (PDCCH) for the user equipment in subframe n; and repeatedly transmits a physical uplink shared channel (PUSCH) corresponding to the PDCCH within D subframe(s) out of every P subframes from subframe n+k, wherein each of k, D, and P is a positive integer, and P may be a predefined value greater than D.

14 Claims, 12 Drawing Sheets

(51) Int. Cl.
  *H04W 4/06* (2009.01)
  *H04L 27/26* (2006.01)
  *H04W 72/04* (2009.01)
  *H04W 72/12* (2009.01)

(52) U.S. Cl.
  CPC ............ *H04W 4/70* (2018.02); *H04L 5/0007* (2013.01); *H04L 5/0051* (2013.01); *H04L 27/2601* (2013.01); *H04W 4/06* (2013.01); *H04W 72/042* (2013.01); *H04W 72/044* (2013.01); *H04W 72/1268* (2013.01); *H04W 72/1273* (2013.01)

(56) References Cited

U.S. PATENT DOCUMENTS

2016/0212761 A1* 7/2016 Li ..................... H04W 72/1268
2016/0338020 A1* 11/2016 Gao ....................... H04W 4/70

FOREIGN PATENT DOCUMENTS

| CN | 104581925 A | 4/2015 |
| WO | WO 2015/012665 A1 | 1/2015 |
| WO | WO 2015/042893 A1 | 4/2015 |

OTHER PUBLICATIONS

Alcatel-Lucent et al., "Considerations for M-PDCCH," R1-152600, 3GPP TSG RAN WG1 Meeting #81, Fukuoka, Japan, May 25-29, 2015, 6 pages.
LG Electronics, "Cross-subframe details for normal and enhanced coverage for Rel-13 MTC UEs," R1-152695, 3GPP TSG RAN WG1 Meeting #81, Fukuoka, Japan, May 25-29, 2015, 5 pages.
NTT DOCOMO et al., "Way Forward on Resource Allocation for PDSCH," R1-153689, 3GPP TSG RAN WG1 Meeting #81, Fukuoka, Japan, May 20-29, 2015, 4 pages.
NTT DOCOMO, "Time and Frequency Relationship for MPDSCH and PDSCH," R1-153320, 3GPP TSG RAN WG1 Meeting #81, Fukuoka, Japan, May 25-29, 2015, pp. 1-6.

* cited by examiner

FIG. 8
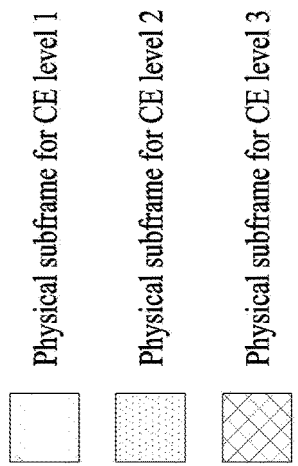

METHOD AND USER EQUIPMENT FOR RECEIVING DOWNLINK SIGNAL, AND METHOD AND BASE STATION FOR TRANSMITTING DOWNLINK SIGNAL

CROSS REFERENCE TO RELATED APPLICATIONS

This application is the National Phase of PCT International Application No. PCT/KR2016/007595, filed on Jul. 13, 2016, which claims priority under 35 U.S.C. 119(e) to U.S. Provisional Application No. 62/192,539, filed on Jul. 14, 2015, and to U.S. Provisional Application No. 62/207,932, filed on Aug. 21, 2015, all of which are hereby expressly incorporated by reference into the present application.

TECHNICAL FIELD

The present invention relates to a wireless communication system and, more particularly, to a method for transmitting or receiving uplink/downlink control and an apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

The technical objects that can be achieved through the present invention are not limited to what has been particularly described hereinabove and other technical objects not described herein will be more clearly understood by persons skilled in the art from the following detailed description.

Technical Solution

According to an aspect of the present invention, provided herein is a method of receiving a downlink (DL) signal by a user equipment (UE) in a wireless communication system, including receiving a physical downlink control channel (PDCCH) for the UE in a subframe n; and repeatedly transmitting a physical uplink shared channel (PUSCH) corresponding to the PDCCH within D subframe(s) at an interval of P subframes, starting from a subframe n+k.

In another aspect of the present invention, provided herein is a user equipment (UE) for receiving a downlink (DL) signal in a wireless communication system, including a radio frequency (RF) unit, and a processor connected to the RF unit and configured to control the RF unit. The processor may control the RF unit to receive a physical downlink control channel (PDCCH) for the UE in a subframe n, and control the RF unit to repeatedly transmit a physical uplink shared channel (PUSCH) corresponding to the PDCCH within D subframe(s) at an interval of P subframes, starting from a subframe n+k.

In another aspect of the present invention, provided herein is a method of transmitting a downlink (DL) signal by a base station (BS) in a wireless communication system, including transmitting a physical downlink control channel (PDCCH) for a user equipment (UE) in a subframe n; and repeatedly receiving a physical uplink shared channel (PUSCH) corresponding to the PDCCH within D subframe(s) at an interval of P subframes, starting from a subframe n+k.

In another aspect of the present invention, provided herein is a base station (BS) for transmitting a downlink (DL) signal in a wireless communication system, including a radio frequency (RF) unit, and a processor connected to the RF unit and configured to control the RF unit. The processor may control the RF unit to transmit a physical downlink control channel (PDCCH) for a user equipment (UE) in a subframe n, and control the RF unit to repeatedly receive a physical uplink shared channel (PUSCH) corresponding to the PDCCH within D subframe(s) at an interval of P subframes, starting from a subframe n+k.

In each aspect of the present invention, each of k, D, and P may be a positive integer and P may be predefined to be greater than D.

In each aspect of the present invention, the PUSCH may be transmitted or received in more than D subframes.

In each aspect of the present invention, DL subframe information indicating subframes available for receiving a DL channel of the UE may be transmitted to the UE.

In each aspect of the present invention, the PDCCH may be transmitted or received multiple times within the available subframes.

In each aspect of the present invention, Y available subframes may occur every X subframes, where Y may be a positive integer and X may be a positive integer greater than Y.

In each aspect of the present invention, the PDCCH may not be received or transmitted starting from a next subframe of the subframe n.

In each aspect of the present invention, the available subframes may be specific to a coverage enhancement level of the UE.

In each aspect of the present invention, the PUSCH may be transmitted or received, using only one resource block. The PDCCH may be transmitted or received, using only one resource block. The PDSCH may be transmitted or received, using only one resource block.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, uplink/downlink signals can be efficiently transmitted/received. Therefore, overall throughput of a wireless communication system is improved.

According to an embodiment of the present invention, a low-price/low-cost UE can communicate with a BS while maintaining compatibility with a legacy system.

According to an embodiment of the present invention, a UE can be implemented with low price/low cost.

According to an embodiment of the present invention, coverage can be enhanced.

According to an embodiment of the present invention, a UE and an eNB can communicate in a narrowband.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 8 illustrates dividing or separating subframes based on each CE level according to an embodiment of the present invention.

MODE FOR INVENTION

Figure 1:
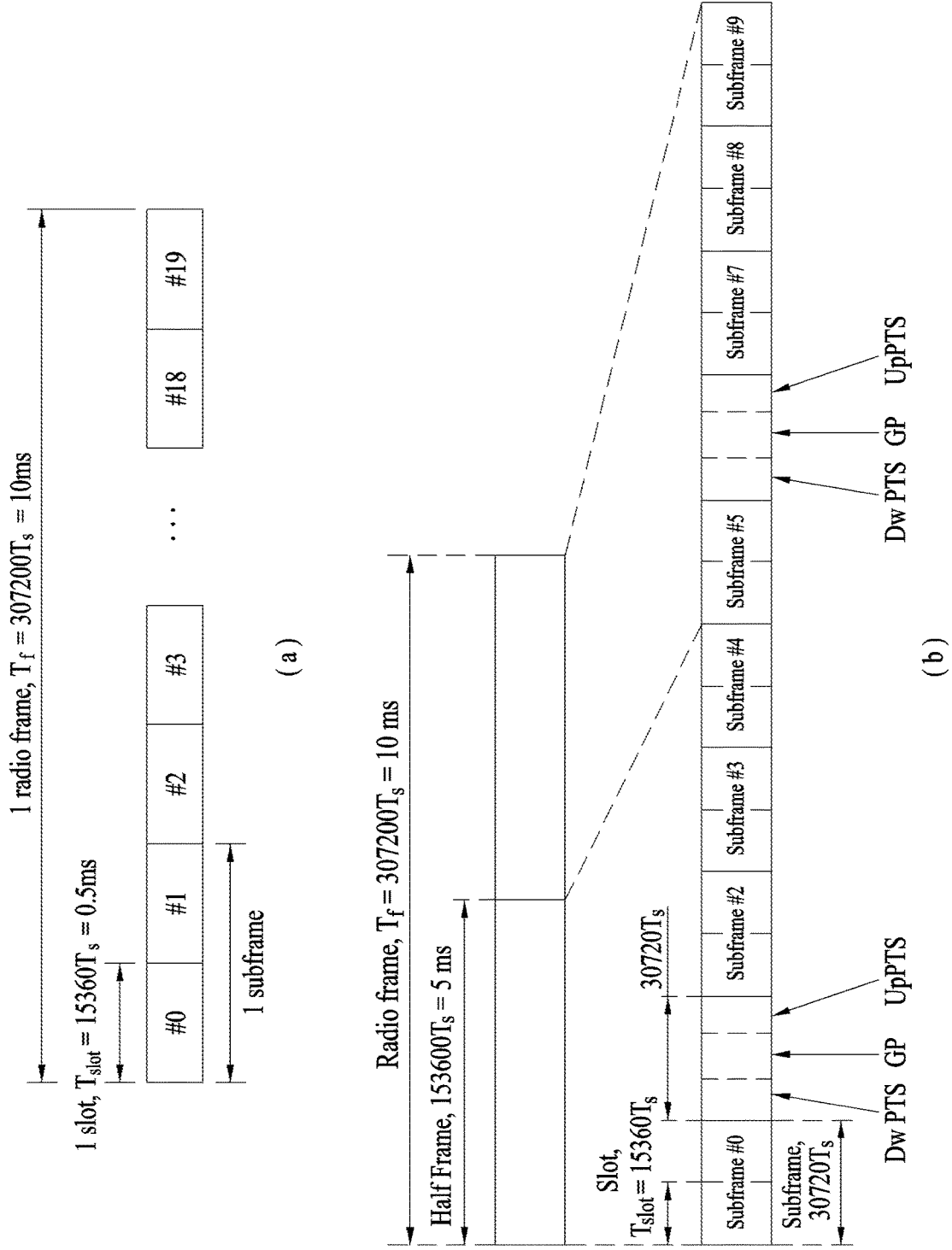
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmitting device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmitting devices always sense carrier of a network and, if the network is empty, the transmitting devices wait for determined time according to locations thereof registered in a list and then transmit data. Various methods are used to determine priority of the transmitting devices in the list and to reconfigure priority. In a system according to some versions of IEEE 802.11 standards, collision may occur and, in this case, a collision sensing procedure is performed. A transmitting device using CSMA/CA avoids collision between data transmission thereof and data transmission of another transmitting device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographic region to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In a LTE/LTE-A based system, The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource. For a detailed CSI-RS configuration, refer to documents such as 3GPP TS 36.211 and 3GPP TS 36.331.

Meanwhile, a 3GPP LTE/LTE-A system uses the concept of a cell to manage a radio resource. A cell associated with the radio resource is different from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signal.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A. The frame structure of FIG. 1(a) is referred to as frame structure type 1 (FS1) and the frame structure of FIG. 1(b) is referred to as frame structure type 2 (FS2).

Referring to FIG. 1, a 3GPP LTE/LTE-A radio frame is 10 ms ($307,200T_s$) in duration. The radio frame is divided into 10 subframes of equal size. Subframe numbers may be assigned to the 10 subframes within one radio frame, respectively. Here, $T_S$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| Special subframe configuration | Normal cyclic prefix in downlink | | | Extended cyclic prefix in down | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | — |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
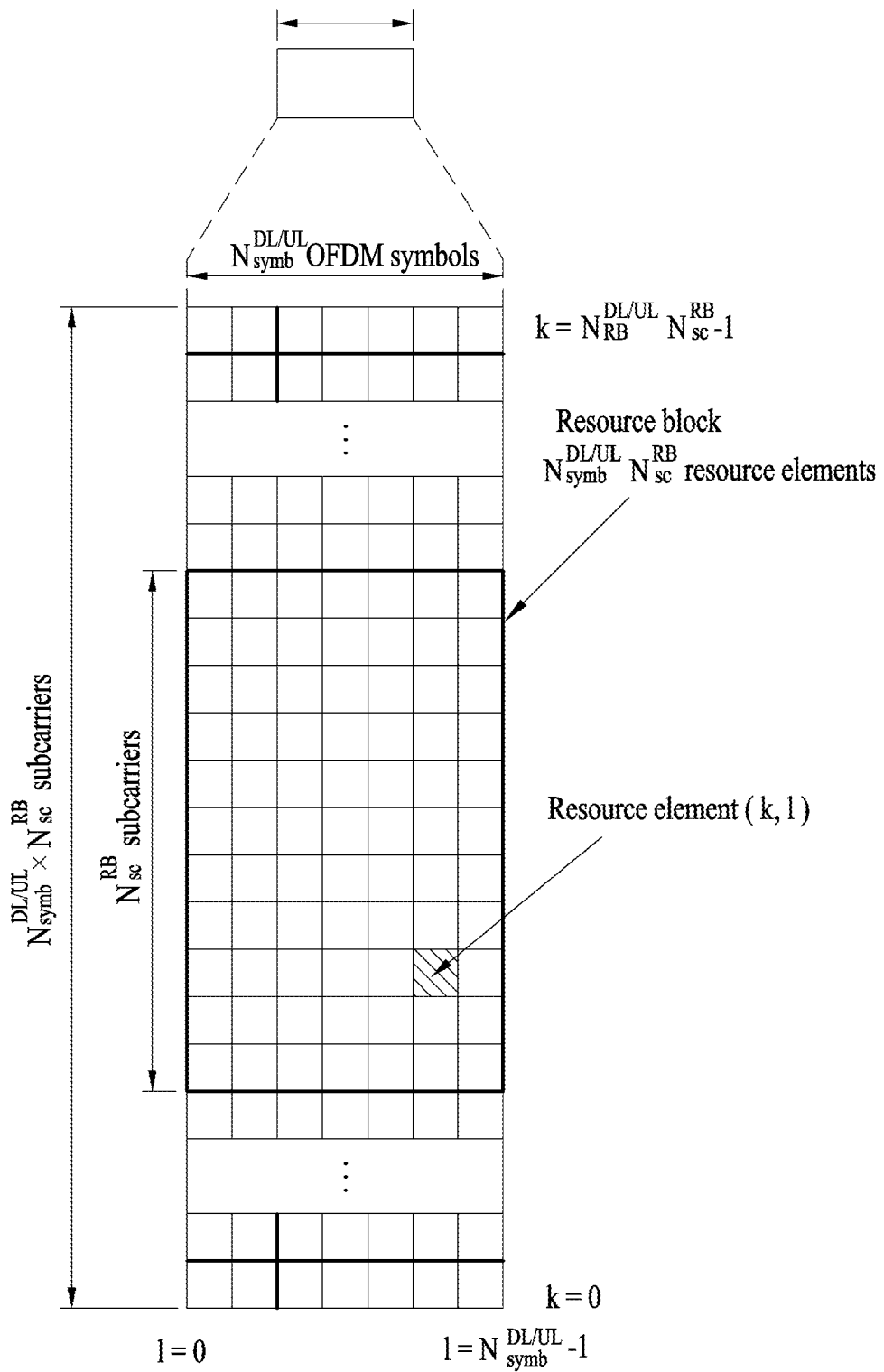
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to as a resource element (RE) or tone. Accordingly, one RB includes $N^{DL/UL}_{symb} * N^{RB}_{sc}$ REs. Each RE within a resource grid may be uniquely defined by an index pair (k, 1) within one slot. k is an index ranging from 0 to $N^{DL/UL}_{RB}*N^{RB}_{sc}-1$ in the frequency domain, and l is an index ranging from 0 to $N^{DL/UL}_{symb}-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
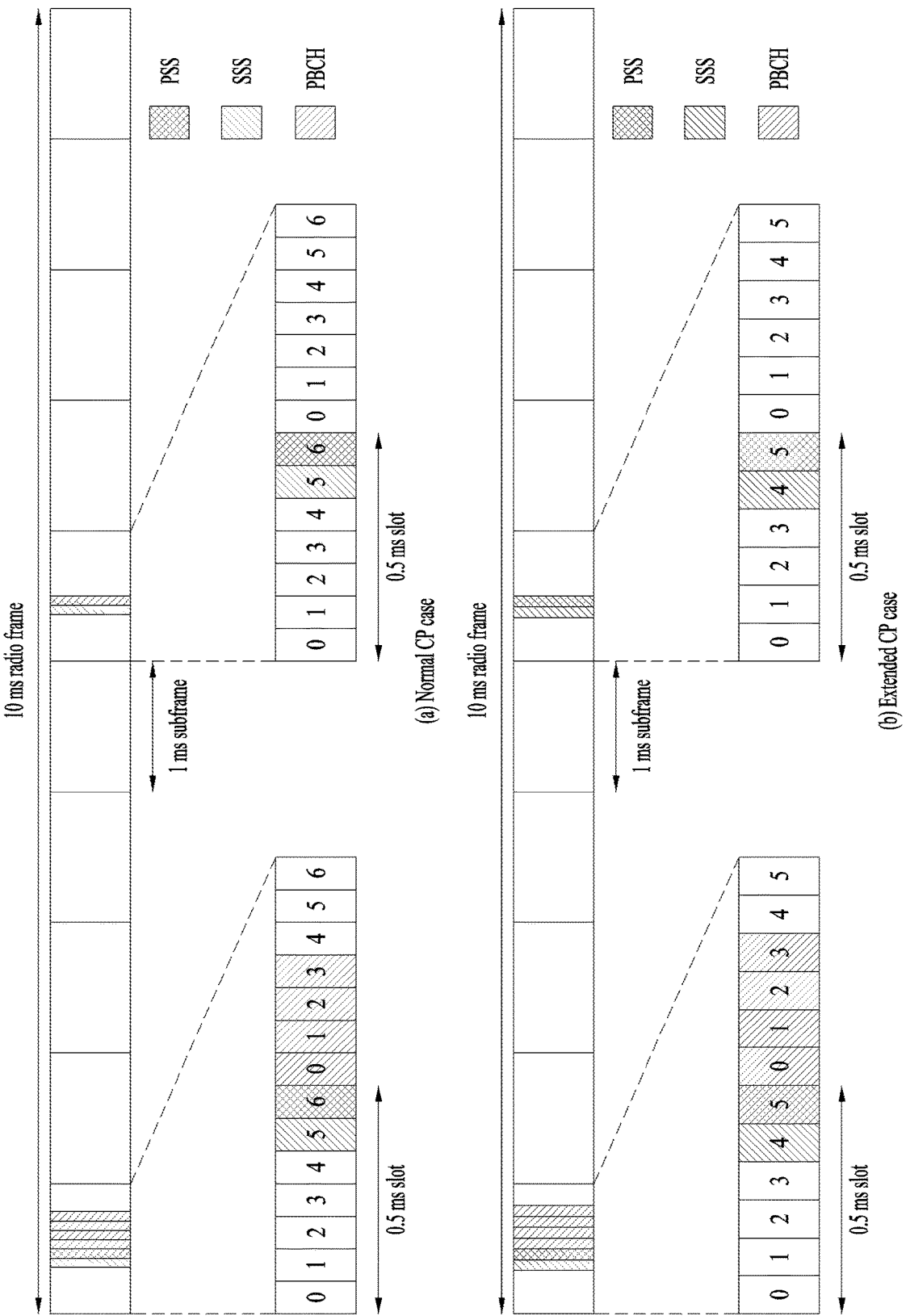
FIG. 3 illustrates a radio frame structure for transmission of a synchronization signal (SS).

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined.

Referring to FIG. 3, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB17 according to included parameters.

The MIB includes most frequency transmitted parameters which are essential for initial access of the UE to a network of the eNB. The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

SIB 1 includes not only information about time-domain scheduling of other SIBs but also parameters needed to determine whether a specific cell is suitable for cell selection. SIB1 is received by the UE through broadcast signaling or dedicated signaling.

A DL carrier frequency and a system BW corresponding to the DL carrier frequency may be acquired by the MIB that the PBCH carries. A UL carrier frequency and a system BW corresponding to the UL carrier frequency may be acquired through system information which is a DL signal. If no stored valid system information about a corresponding cell is present as a result of receiving the MIB, the UE applies a DL BW in the MIB to a UL BW until SIB2 is received. For example, the UE may recognize an entire UL system BW which is usable for UL transmission thereby through UL-carrier frequency and UL-BW information in SIB2 by acquiring SIB2.

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

After initial cell search, the UE may perform a random access procedure to complete access to the eNB. To this end, the UE may transmit a preamble through a physical random access channel (PRACH) and receive a response message to the preamble through a PDCCH and a PDSCH. In contention based random access, the UE may perform additional PRACH transmission and a contention resolution procedure of a PDCCH and a PDSCH corresponding to the PDCCH.

After performing the aforementioned procedure, the UE may perform PDCCH/PDSCH reception and PUSCH/PUCCH transmission as general uplink/downlink transmission procedures.

Figure 4:
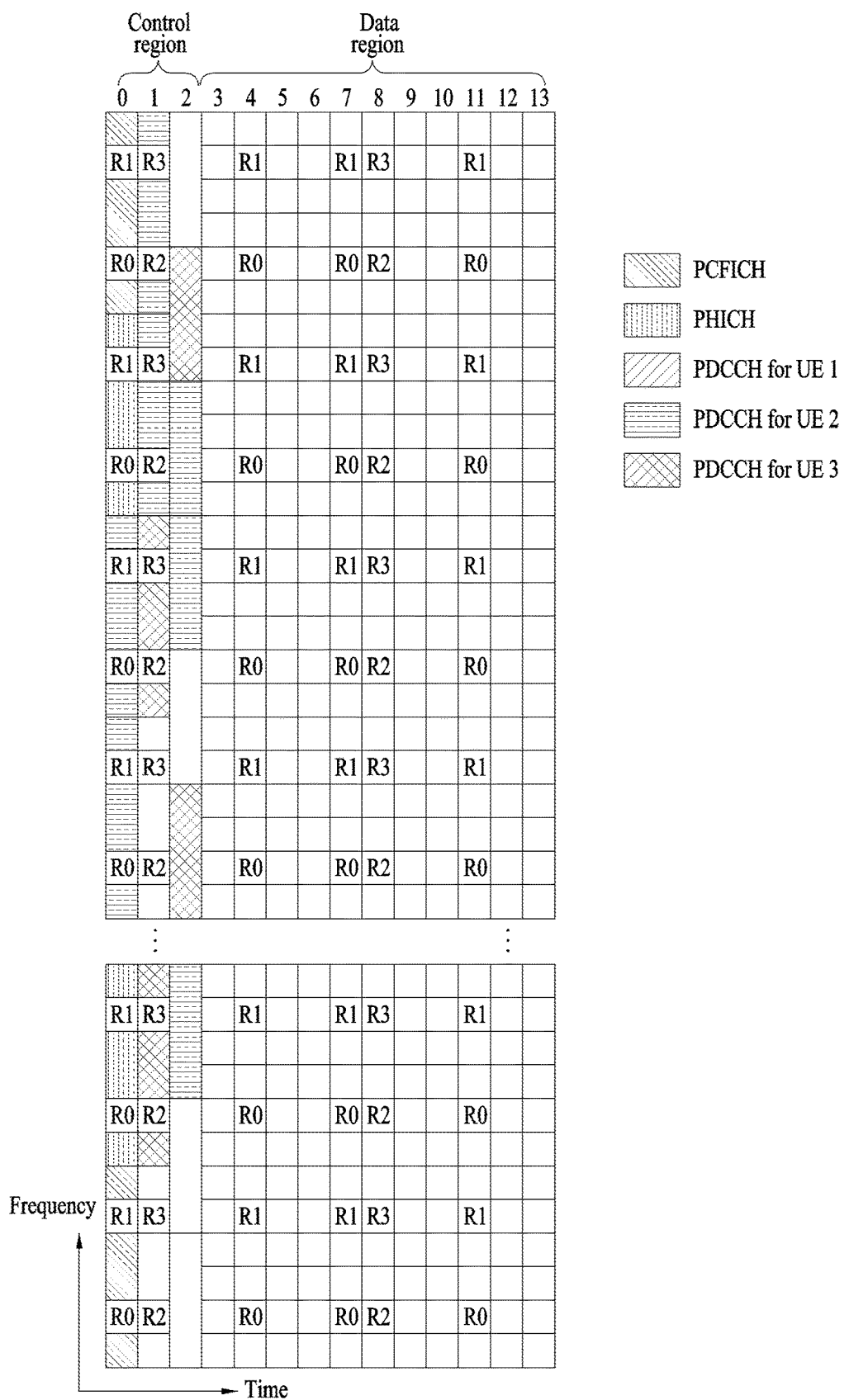
FIG. 4 illustrates the structure of a DL subframe used in a wireless communication system.

FIG. 4 illustrates the structure of a DL subframe used in a wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs.

A set of OFDM symbols available for the PDCCH at a subframe is given by the following Table.

TABLE 3

| Subframe | Number of OFDM symbols for PDCCH when $N^{DL}_{RB} > 10$ | Number of OFDM symbols for PDCCH when $N^{DL}_{RB} \leq 10$ |
|---|---|---|
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

A subset of downlink subframes within a radio frame on a carrier for supporting PDSCH transmission may be configured as MBSFN subframe(s) by a higher layer. Each MBSFN subframe is divided into a non-MBSFN region and an MBSFN region. The non-MBSFN region spans first one or two OFDM symbols, and its length is given by Table 3. The same CP as cyclic prefix (CP) used for subframe 0 is used for transmission within the non-MBSFN region of the MBSFN subframe. The MBSFN region within the MBSFN subframe is defined as OFDM symbols which are not used in the non-MBSFN region.

The PCFICH carries a control format indicator (CFI), which indicates any one of values of 1 to 3. For a downlink system bandwidth $N^{DL}_{RB} > 10$, the number 1, 2 or 3 of OFDM symbols which are spans of DCI carried by the PDCCH is given by the CFI. For a downlink system bandwidth $N^{DL}_{RB} \leq 10$, the number 2, 3 or 4 of OFDM symbols which are spans of DCI carried by the PDCCH is given by CFI+1. The CFI is coded in accordance with the following Table.

TABLE 4

| CFI | CFI code word <$b_0, b_1, \ldots, b_{31}$> |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread with a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

The PDCCH is allocated to first m number of OFDM symbol(s) within a subframe. In this case, m is an integer equal to or greater than 1, and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=floor(N_{REG}/9)$.

A DCI format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) "A" and information about data transmitted using a radio resource "B" (e.g. frequency location) and using transport format information "C" (e.g. transport block size, modulation scheme, coding information, etc.) is transmitted in a specific DL subframe. Then, the UE monitors the PDCCH using RNTI information thereof. The UE having the RNTI "A" receives the PDCCH and receives the PDSCH indicated by "B" and "C" through information of the received PDCCH.

Figure 5:
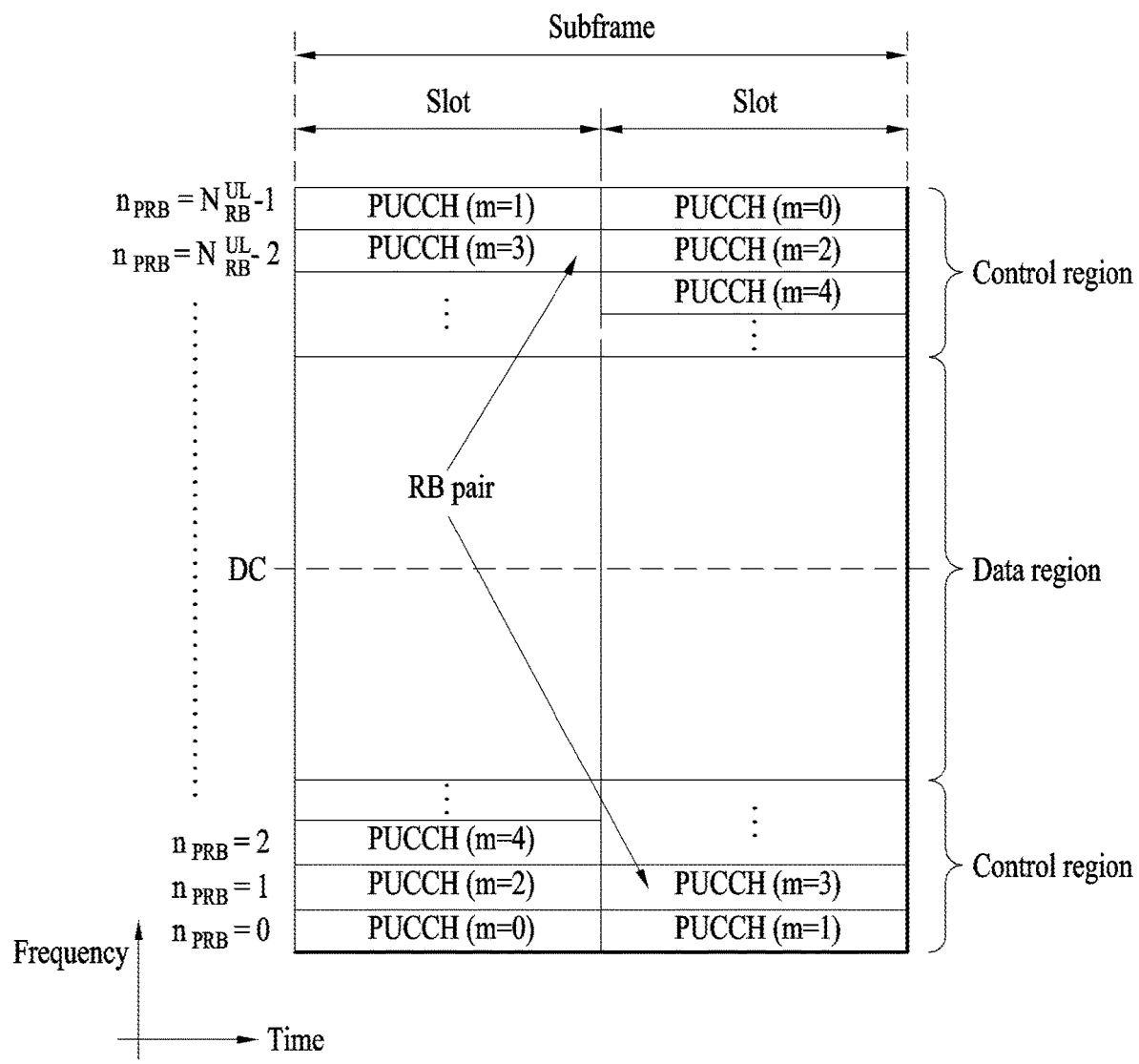
FIG. 5 illustrates the structure of a UL subframe used in a wireless communication system.

FIG. 5 illustrates the structure of a UL subframe used in a wireless communication system.

Referring to FIG. 5, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

A general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC).

For example, three 20 MHz CCs in each of UL and DL are aggregated to support a BW of 60 MHz. The CCs may be contiguous or non-contiguous in the frequency domain. Although a case that a BW of UL CC and a BW of DL CC are the same and are symmetrical is described, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

A configured cell refers to a cell in which CA is performed for a UE based on measurement report from another eNB or UE among cells of an eNB and is configured for each UE. The configured cell for the UE may be a serving cell in terms of the UE. The configured cell for the UE, i.e. the serving cell, pre-reserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell.

For reference, a carrier indicator (CI) means a serving cell index ServCellIndex and CI=0 is applied to a Pcell. The serving cell index is a short identity used to identify the serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

On the contrary, since a plurality of serving cells may be configured in a multi-carrier system, transmission of UL/DL grant through a serving cell having a good channel status may be allowed. In this way, if a cell carrying UL/DL grant which is scheduling information is different from a cell where UL/DL transmission corresponding to the UL/DL grant is performed, this will be referred to as cross-carrier scheduling.

Hereinafter, the case where the cell is scheduled from itself and the case where the cell is scheduled from another cell will be referred to as self-CC scheduling and cross-CC scheduling, respectively.

For data transmission rate enhancement and stable control signaling, the 3GPP LTE/LTE-A may support aggregation of a plurality of CCs and a cross carrier-scheduling operation based on the aggregation.

If cross-carrier scheduling (or cross-CC scheduling) is applied, a PDCCH for downlink allocation for a DL CC B or DL CC C, that is, carrying a DL grant may be transmitted through a DL CC A, and a corresponding PDSCH may be transmitted through the DL CC B or DL CC C. For cross-CC scheduling, a carrier indicator field (CIF) may be introduced. The presence or absence of the CIF within the PDCCH may be semi-statically and UE-specifically (or UE-group-specifically) configured by higher layer signaling (e.g., RRC signaling).

Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH).

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port p {107,108,109,110} as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

For each serving cell, higher layer signaling can configure a UE with one or two EPDCCH-PRB-sets for EPDCCH monitoring. The PRB-pairs corresponding to an EPDCCH-PRB-set are indicated by higher layers. Each EPDCCH-PRB-set consists of set of ECCEs numbered from 0 to $N_{ECCE,p,k}-1$, where $N_{ECCE,p,k}$ is the number of ECCEs in EPDCCH-PRB-set p of subframe k. Each EPDCCH-PRB-set can be configured for either localized EPDCCH transmission or distributed EPDCCH transmission.

The UE shall monitor a set of EPDCCH candidates on one or more activated serving cells as configured by higher layer signaling for control information.

The set of EPDCCH candidates to monitor are defined in terms of EPDCCH UE-specific search spaces. For each serving cell, the subframes in which the UE monitors EPDCCH UE-specific search spaces are configured by higher layers.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB.

Figure 6:
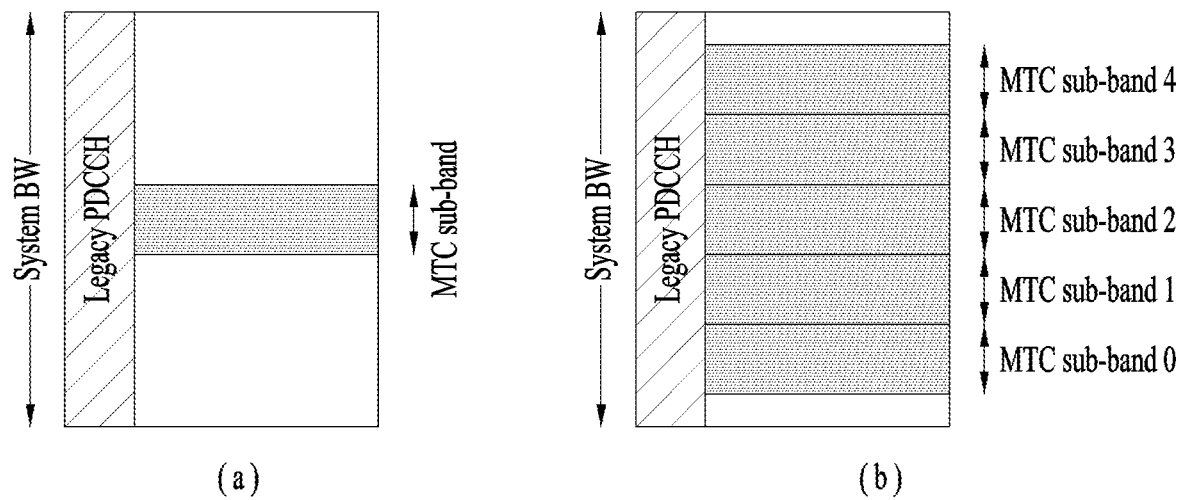
FIG. 6 illustrates an exemplary signal band for MTC.

FIG. 6 illustrates an exemplary signal band for MTC.

As one method of reducing the cost of an MTC UE, the MTC UE may operate in, for example, a reduced DL and UL bandwidths of 1.4 MHz regardless of the system bandwidth when the cell operates. In this case, a sub-band (i.e., narrowband) in which the MTC UE operates may always be positioned at the center of a cell (e.g., 6 center PRBs) as shown in FIG. 6(a), or multiple sub-bands for MTC may be provided in one subframe to multiplex MTC UEs in the subframe such that the UEs use different sub-bands or use the same sub-band which is not a sub-band consisting of the 6 center PRBs as shown in FIG. 6(b).

In this case, the MTC UE may not normally receive a legacy PDCCH transmitted through the entire system bandwidth, and therefore it may not be preferable to transmit a PDCCH for the MTC UE in an OFDM symbol region in which the legacy PDCCH is transmitted, due to an issue of multiplexing with a PDCCH transmitted for another UE. As one method to address this issue, introduction of a control channel transmitted in a sub-band in which MTC operates for the MTC UE is needed. As a DL control channel for such low-complexity MTC UE, a legacy EPDCCH may be used. Alternatively, an M-PDCCH, which is a variant of the legacy EPDCCH, may be introduced for the MTC UE. In the present invention described hereinbelow, the legacy EPDCCH or the M-PDCCH for a low-complexity or normal-complexity MTC UE will be referred to as an M-PDCCH. Hereinafter, an MTC-EPDCCH has the same meaning as the M-PDCCH.

A data channel (e.g., a PDSCH or a PUSCH) and/or a control channel (e.g., an M-PDCCH, a PUCCH, or a PHICH) may be transmitted repeatedly through multiple subframes or may be transmitted using a TTI bundling scheme, for coverage enhancement (CE) of a UE. Additionally, for CE, the control/data channel may be transmitted using a scheme such as cross-subframe channel estimation or frequency (narrowband) hopping. Herein, cross-subframe channel estimation refers to a channel estimation method using not only an RS in a subframe in which a corresponding channel is present but also an RS in neighboring subframe (s).

An MTC UE may require CE up to, for example, 15 dB. However, all MTC UEs are not always under an environment requiring CE, nor are requirements for quality of service (QoS) of all MTC UEs the same. For example, devices such as a sensor and a meter have limited mobility and a small amount of data transmission and reception and have a high possibility of being located in a shadow area, thereby requiring high CE. However, wearable devices such as a smartwatch etc. may have greater mobility and a relatively large amount of data transmission and reception and have a high possibility of being located in a non-shadow area. Therefore, all MTC UEs do not necessarily require CE of a high level and demanded capabilities of CE may differ according to types of MTC UEs.

To further lower the cost of the MTC UE, an environment in which the MTC operates through a narrow bandwidth of about 200 kHz may be considered. Such an MTC UE, i.e., the MTC UE capable of operating only within the narrow bandwidth, may also operate backward-compatibly in a legacy cell having a wider bandwidth than 200 kHz. A clean frequency band in which the legacy cell is not present may be deployed only for this MTC UE.

In the present invention, UEs which operate in a narrow band about 200 kHz are multiplexed in the same band by time division multiplexing (TDM) rather than frequency division multiplexing (FDM).

The present invention proposes a method of multiplexing multiple UEs when the MTC UEs operates within a narrow band of about 200 kHz.

For convenience, the present invention will be described based on an environment in which the MTC UE operates in a system deployed only for MTC. However, it is apparent that the contents and sprits of the present invention are applicable to other UEs and systems.

When the MTC UE operates through a narrow bandwidth (e.g., 200 kHz), subframe spacing, PRB size, sample length, slot/subframe length, etc., used in a current LTE system, may be used without change or with modification in a system in which the MTC UE operates. In this case, the MTC UE may operate in a system having a bandwidth of one PRB (corresponding to 200 kHz with guard bandwidth or 180 kHz without guard bandwidth).

Hereinafter, embodiments of the present invention will be described in terms of DL channel transmission or in terms of UL channel transmission, for convenience of description. However, the embodiments described in terms of DL channel transmission may be equally or similarly applied to UL channel transmission and the embodiments described in terms of UL channel transmission may be equally or similarly applied to DL channel transmission. DL channels mentioned in the present invention may indicate only UE-specific DL channels (e.g., a UE-specific PDCCH and a unicast/UE-specific PDSCH).

A. Division of Subframes According to CE Level

The present invention proposes dividing subframes according to CE level or MTC UE. According to the present invention, each CE level or each MTC UE enables transmission/reception only in subframes configured or predefined for the CE level or the MTC UE rather than any subframes. When UL/DL transmission is repeatedly performed for CE, since subframes for a corresponding CE level or a corresponding UE will discontinuously appear in the physical time domain, latency increases but a control/data channel may be repeatedly transmitted at various timings, thereby reinforcing time diversity.

Figure 7:
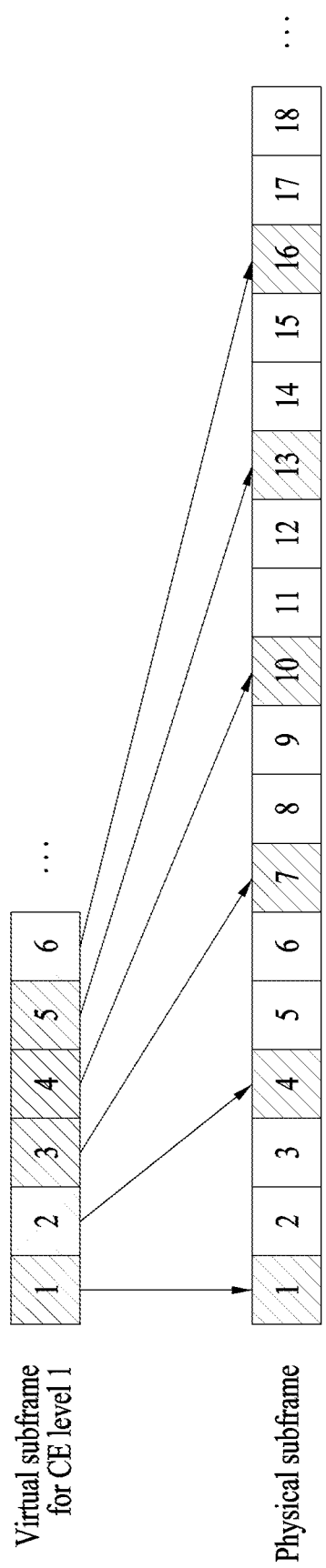
FIG. 7 illustrates dividing or separating subframes according to an embodiment of the present invention.

FIG. 7 illustrates dividing or separating subframes according to an embodiment of the present invention.

Subframes which can be used by an MTC UE may vary with the CE level of the MTC UE. As illustrated in FIG. 7, for a specific CE level (e.g., CE level 1), some subframes among all physical subframes may be configured as subframes for DL channel(s) transmission for the specific CE level. Hereinafter, the some physical subframes for the specific CE level will be referred to as virtual subframes for the specific CE level. In this case, a mapping rule or equation for mapping the virtual subframes for the specific CE level to physical subframes used for actual transmission may be present. The virtual subframes for the specific CE level may be sequentially numbered.

A PRACH resource set may be defined per CE level. The UE may assume that a CE level, corresponding to a PRACH resource set in which the UE has succeeded in performing a random access procedure, is the (initial) CE level thereof.

The UE attempts to perform or performs DL reception only within subframes configured to be available in the CE level thereof and does not attempt to perform or does not perform DL reception in the other subframes, i.e., subframes for the other CE levels. In subframes other than the subframes configured for the CE level of the UE, other UEs, i.e., UE(s) not configured with the corresponding subframes, may receive their DL signals/channels. A UE may treat subframes which are not configured for a CE level thereof as invalid subframes.

FIG. 8 illustrates dividing or separating subframes based on each CE level according to an embodiment of the present invention.

The locations of subframes for each CE level, i.e., the locations of physical subframes in which MTC UEs having different CE levels can transmit DL channels, may be configured not to overlap each other.

For example, it is assumed that the CE level of an MTC UE is divided into three levels, CE level 1, CE level 2, and CE level 3. As illustrated in FIG. 8(a), locations of physical subframes of the respective CE levels may be interlaced in the unit of subframes.

Alternatively, although the locations of physical subframes available in each CE level are interlaced, the ratio of the number of subframes used in each CE level may differ. For example, CE level 1, CE level 2, and CE level 3 may use M1, M2, and M3 consecutive or non-consecutive physical subframes, respectively, at a period of N physical subframes. Herein, M1+M2+M3 may be equal to N. As illustrated in FIG. 8(*b*), CE level 1 may use one subframe at a period of 7 subframes, CE level 2 may use two consecutive physical subframes at a period of 7 subframes, and CE level 3 may use three consecutive physical subframes at a period of 7 subframes. For example, subframe # m satisfying 'm mod 7=1' may be configured for CE level 1, subframe # m satisfying 'm mod 7=2 or 3' may be configured for CE level 2, and subframe # m satisfying 'm mod 7=4, 5, or 6' may be configured for CE level 3.

Information about physical subframes for each CE level, e.g., information about the locations of physical subframes for a CE level, or information about the locations of subframes for a CE level of a specific UE may be fixed or may be configured through an SIB or an RRC signal.

In other words, resources which can be used for each coverage class may be virtually determined. For example, it is assumed that 4 coverage classes are supported by a network and two subframes are used to carry/transmit synchronization and system information in one radio frame having a length of 10 ms (i.e., 10 subframes). In this case, the other 8 subframes may be divided into a total of 4 groups each having two subframes and the 4 coverage classes may use the 4 groups, respectively. Through this scheme, time diversity may be acquired. Since the coverage classes are time-division-multiplexed, latency may be reduced.

Alternatively, assignment of subframes to a coverage class may be considered in the unit of radio frames rather than in the unit of subframes. For example, when 4 coverage classes are present and one radio frame is used per 5 radio frames for transmission of synchronization and system information, the other 4 radio frames may be mapped to the 4 coverage classes in one-to-one correspondence. This means contiguous resource blocks virtually, i.e., the same physical resource block in contiguous virtual subframes, and both a control channel and a data channel in the corresponding virtual resource block may be mapped. Contiguous virtual subframes may be mapped to contiguous or non-contiguous physical subframes. In addition, the contiguous virtual subframes may be mapped to consecutive physical subframes excluding invalid subframes (e.g., subframes predefined for other purposes, DL subframes in UL transmission, or UL subframes in DL transmission).

A unit in which respective time resources for coverage classes are interlaced may be one subframe, one radio frame, several subframes, or several radio frames. System information or synchronization channels (e.g., a PSS and an SSS) may be transmitted/received using a fixed time-frequency resource and a time-frequency resource for the system information or the synchronization channel may be provided to UE(s) through the system information.

B. UE Multiplexing

Figure 9:
FIG. 9 illustrates multiplexing UEs according to an embodiment of the present invention.

FIG. 9 illustrates multiplexing of UEs according to an embodiment of the present invention.

In all subframes or within subframes which can be used for a CE level needed by an MTC UE, only some subframe(s) may be used for actual transmission of a DL channel for the MTC UE.

The locations of subframes in which the MTC UE receives the DL channel may be configured by one or multiple consecutive subframes at a period of a specific number of subframes among all subframes or subframes which can be used for the CE level of the MTC UE.

For example, the locations of subframes in which a DL channel is transmitted for a specific MTC UE may be configured as illustrated in FIG. 9. To transmit DL channels to multiple MTC UEs having CE level L when virtual subframes for CE level L among multiple CE levels are present, the DL channels for the multiple MTC UEs may be transmitted through TDM in the unit of a single subframe or in the unit of multiple subframes. That is, as illustrated in FIG. 9, DL channels transmitted to three UEs UE 1, UE 2, and UE 3 having CE level L may be interlaced in the unit of a single subframe or in the unit of multiple subframes in the virtual subframe axis.

Subframes for a specific CE level, in which DL channels of multiple UEs are transmitted through TDM may be mapped to physical subframes by a mapping rule of virtual subframes to physical subframes as described in Section A.

Among virtual subframes for the specific CE level, the locations of virtual subframes in which a DL channel for the specific MTC UE is transmitted may be determined as follows. Such resources may mean contiguous resource blocks and/or contiguous subframes, which are virtually configured for each coverage class, rather than physical resources. In other words, non-contiguous physical resource blocks and/or physical resource subframes may be transmitted to multiple UEs in an interlaced form. This resource portioning may be applied to both a control signal and data that the UEs are to receive or may be applied only to the data. In this case, the control signal may include a dynamic indication indicating whether the data will be interlaced.

Implicit Configuration

The locations of subframe(s) in which a specific UE can expect that a DL channel will be transmitted thereto may be determined by implicit configuration. For example, the locations of subframes in which a DL channel can be transmitted to the UE may be determined by a UE ID (e.g., C-RNTI). The implicit configuration scheme may be used particularly to determine the locations of subframes in which a PDCCH and/or a PDSCH (hereinafter, PDCCH/PUSCH) for the specific UE is transmitted or can be transmitted.

Blind Decoding

A specific UE may expect that a DL channel will be transmitted thereto through one of multiple subframe groups and blind-detect the DL channel transmitted thereto with respect to the multiple subframe groups. For example, when a subframe index is m and G subframe groups are present, the specific UE may determine that subframes having the same value obtained through 'm mod G' during a specific subframe duration belong to the same subframe group and blind-detect the DL channel with respect to each of the G subframe groups. The blind decoding scheme may be used particularly when the UE determines the location of a subframe in which a PDCCH is transmitted.

RRC Configuration

The location of a subframe in which a specific UE can expect that a DL channel will be transmitted thereto may be determined by RRC configuration. Through RRC configuration, an eNB may configure, for the UE, an index of a subframe or an index of a subframe group/pattern, in which a DL channel for the UE is transmitted or can be transmitted. This RRC configuration scheme may be used particularly to determine the location of a subframe in which a PDCCH and/or a PDSCH for a specific UE is transmitted or can be transmitted.

DCI Configuration

The location of a subframe in which a specific UE can expect that a DL channel will be transmitted thereto may be configured through a PDCCH/DCI. Through the DCI, the eNB may configure, for the UE, an index of a subframe or an index of a subframe group/pattern, in which a DL channel for the UE is transmitted or can be transmitted. This DCI configuration scheme may be used particularly to determine the location of a subframe in which a PDSCH for a specific UE is transmitted or can be transmitted.

In the present invention, the UE/eNB may transmit or receive a data/control channel for the UE through non-consecutive physical subframes/frames, non-contiguous physical subframes/frames, or discontinuous physical subframes/frames (hereinafter, non-consecutive subframes).

The UE attempts to perform or performs DL reception only within subframes configured to be available therefor and does not attempt to perform or does not perform DL reception in the other subframes, i.e., subframes which are not configured therefor. In subframes other than subframes configured for a specific UE, other UEs, i.e., UE(s) not configured with the subframes configured for the specific UE, may receive their DL signals/channels. The UE may treat the subframes which are not configured for DL transmission thereof as invalid subframes.

According to Section A and/or Section B, the UE does not receive a DL channel/signal in subframes which are not configured for a corresponding CE level or transmission of the UE. The subframes which are not configured for the UE or the corresponding CE level may be used as a DL reception gap for the UE or the CE level. The UE will treat subframes except for subframes available thereby as unavailable subframes therefor. Accordingly, if the unavailable subframes for the UE are previously fixed (i.e., previously designated) or are configured for the UE through an SIB etc., this means that information about subframes available for the CE level or the UE are previously fixed or are configured.

C. Processing of Invalid Subframe

As described in Section A, when virtual subframes for transmitting DL channels are mapped to physical subframes which are used during actual transmission, specific physical subframes may have a difficulty in being used to transmit a UE-specific DL channel (e.g., a UE-specific PDCCH or a unicast/UE-specific PDSCH). Hereinafter, such subframes will be referred to as invalid subframes. For example, the following invalid subframes may be present.

Subframes used for transmission of a synchronization signal (SS)

Subframes used for transmission of system information (e.g., subframes used for transmission of a PBCH and/or transmission of an SIB)

When virtual subframes for DL channel transmission are mapped to physical subframes used for actual transmission, if a physical subframe to be used is an invalid subframe, the following operations may be performed.

Alt 1-1.

Mapping of a virtual subframe to a physical subframe may be applied to all physical subframes. That is, even when an invalid subframe is present among physical subframes to which virtual subframes are mapped, the locations of the physical subframes to which the virtual subframes are mapped are not changed.

In this case, transmission of a DL channel in a corresponding (invalid physical) subframe may be punctured. That is, even when the invalid physical subframe is present, resource mapping of the corresponding DL channel is not changed. However, when the corresponding DL channel in the invalid physical subframe collides with a transmission resource of another channel, transmission of the DL channel in colliding RE resources or in all subframes in which resources collide may be punctured.

Alt 1-2.

Mapping of a virtual subframe to a physical subframe may be applied to all physical subframes. That is, even when an invalid subframe is present among physical subframes to which virtual subframes are mapped, the locations of the physical subframes to which the virtual subframes are mapped are not changed.

In this case, transmission of a DL channel in a corresponding (invalid physical) subframe may be rate-matched. That is, when the invalid physical subframe is present, the DL channel may not be mapped to a resource of the corresponding subframe and may be mapped to the next (valid) physical subframe.

Alt 2

Mapping of a virtual subframe to a physical subframe may be applied only to a valid physical subframe. That is, among physical subframes, invalid subframes are excluded from subframes used for transmission of a DL channel. A UE may assume that the invalid subframes are excluded from subframes used to map virtual subframes to physical subframes. For example, referring to FIG. 7, one subframe per three subframes may be included in subframes used for a specific CE level. For example, when subframes #6 and #7 are invalid subframes, according to Alt 1-1 or Alt 1-2, subframes #1, #4, #7, #10, . . . constitute subframes used for the CE level. One the other hand, when subframes #6 and #7 are invalid subframes, according to Alt 2, physical subframes excluding subframes #6 and #7 are used to map virtual subframes to physical subframes. Then, according to Alt 2, subframes #1, #4, #9, #12, . . . may be included in subframes used for the CE level.

D. Frame Structure

In the case of a UE performing communication (only) using one PRB, transmission may become longer than the number of subframes distinguishable by UEs. For example, a system frame number (SFN) is initialized to 0 when the SFN becomes a predetermined number. If transmission is performed for a longer time than a time duration of the predetermined number, the UE cannot distinguish between subframes. In consideration of this point, the UE of the present invention may perform transmission/reception in the unit of one or two super-subframes, as opposed to a legacy system in which transmission is performed in the unit of less subframes, so that the UE may distinguish between time units.

Figure 10:
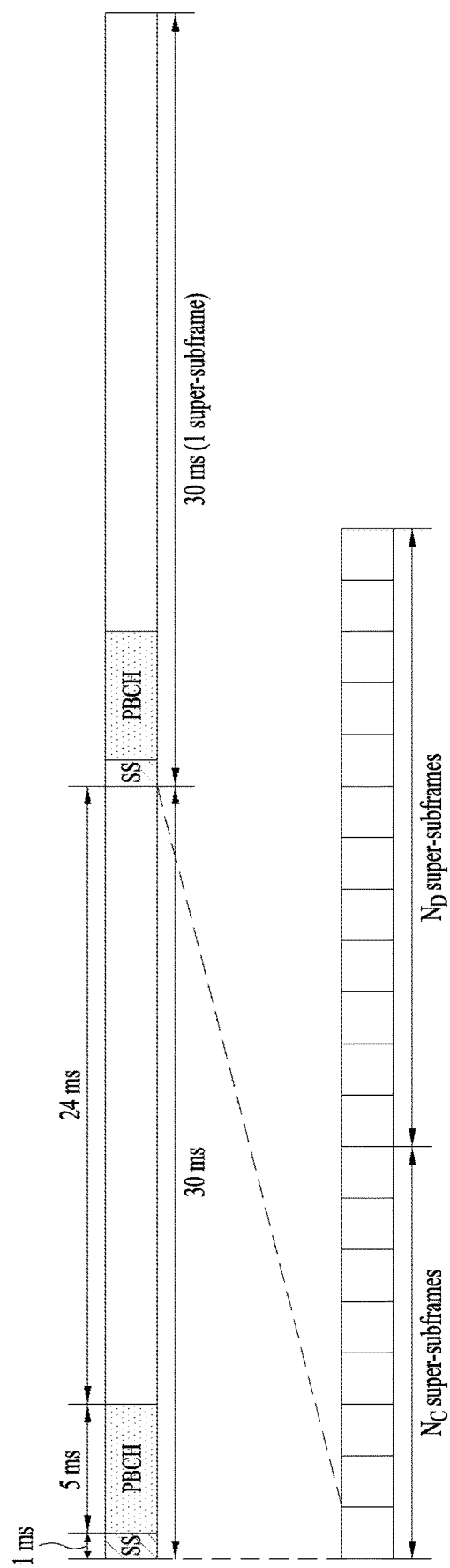
FIG. 10 illustrates a DL frame structure according to an embodiment of the present invention.

FIG. 10 illustrates a DL frame structure according to an embodiment of the present invention.

If an MTC UE operates through, for example, narrow bandwidth of one PRB, a DL frame structure of a corresponding system may be as follows.

As illustrated in FIG. 10, in an environment in which a system bandwidth is one PRB and the length of a subframe is 1 ms, multiple consecutive subframes (e.g., 30 subframes) may constitute one super-subframe.

One super-subframe may include subframe(s) in which an SS is transmitted, subframe(s) in which system information (e.g., a PBCH (MIB) or an SIB) is transmitted, and subframe(s) in which a control/data channel (e.g., a PDCCH or a PDSCH) is transmitted. For example, a total of 30 subframes including one subframe in which the SS is transmitted, 5 subframes in which the PBCH is transmitted, and 24 subframes in which the control/data channel such as the PDCCH/PDSCH is transmitted may constitute the super-subframe.

In this case, for example, $N_C$ consecutive super-subframes may be used to transmit the PDCCH and the subsequent $N_D$ consecutive super-subframes may be used to transmit the PDSCH. Such a pattern (or locations) of super-subframes which are available for transmission of the PDCCH and/or the PDSCH (hereinafter, PDCCH/PDSCH) may be fixed or may be configured for the UE through a PBCH, an SIB, or RRC.

As proposed in Section A, super-subframes which can be used by the UE with respect to each coverage class may be distinguished from each other within the $N_C$ super-subframes for transmission of the PDCCH and/or the $N_D$ super-subframes for transmission of the PDSCH. Respective super-subframes for coverage classes may be distinguished by a TDM scheme. For example, when there are 4 coverage classes supported by a network, super-subframes for each coverage class may be distinguished by TDM such that, within $N_C$ (=8) super-subframes for transmission of the PDCCH, super-subframes #0 and #4 are used for the first coverage class, super-subframes #1 and #5 are used for the second coverage class, super-subframes #2 and #6 are used for the third coverage class, and super-subframes #3 and #7 are used for the fourth coverage class. Alternatively, super-subframe(s) applied to each coverage class may be distinguished in the unit of multiple super-subframes rather than in the unit of a single super-subframe.

As mentioned previously, a data channel and/or a control channel (hereinafter, data/control channel or control/data channel) transmitted by an MTC UE requiring CE may be repeatedly transmitted through non-consecutive subframes. Non-consecutive repetitive transmission of the control/data channel may increase a transmission/reception latency but cause a time diversity effect, so that the number of repetitions and the number of subframes used for transmission may be reduced. Therefore, entire system throughput may be increased.

Hereinafter, when the MTC UE repeatedly transmits/receives a control/data channel through non-consecutive subframes, embodiments of a UE operation, a transmission subframe, etc. during repeated transmission/reception of the corresponding channel will be proposed. The following embodiments may be used together with at least one of the embodiments described in Section A to Section D.

Figure 11:
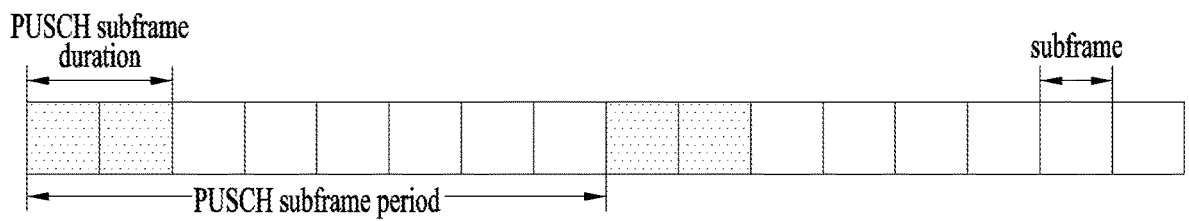
FIG. 11 illustrates an example of transmission of a UL channel according to an embodiment of the present invention.

FIG. 11 illustrates an example of transmission of a UL channel according to an embodiment of the present invention.

As described earlier, in an MTC environment requiring CE, a data/control channel may be repeatedly transmitted through non-consecutive subframes in order to obtain a time diversity effect in transmission of the data/control channel. For example, as illustrated in FIG. 11, a PUSCH may be repeatedly transmitted during a specific subframe duration (e.g., a PUSCH subframe duration) at a specific subframe interval (e.g., a PUSCH subframe period). Alternatively, since an invalid subframe in which the data/control channel cannot be transmitted during a transmission duration of the data/control channel occurs and the data/control channel cannot be transmitted in the invalid subframe, the data/control channel may be transmitted in non-consecutive subframes.

Subframe(s) available in a corresponding UE or a corresponding CE level may be indicated by a PUSCH/PDSCH subframe period and a bitmap consisting of bits corresponding one by one to subframes in the PUSCH/PDSCH subframe period. In other words, the bitmap, instead of the subframe duration, may be used to indicate subframes available for transmission of the PUSCH/PDSCH in the PUSCH/PDSCH subframe period. The bitmap may consist of bits corresponding one by one only to valid subframes except for invalid subframes among subframes in the PUSCH/PDSCH subframe period. For example, in TDD, a bitmap may consist of bits corresponding one by one to UL subframes except for DL subframe(s) among physical subframes corresponding to a PUSCH subframe period. As another example, in TDD, the bitmap may consist of bits corresponding one by one to (valid) DL subframes except for UL subframe(s) among physical subframes corresponding to a PDSCH subframe period. It may be assumed that subframes defined for other purposes (e.g., transmission of an SS/SIB/PBCH) are not the valid DL subframes.

Hereinafter, although embodiments of the present invention will be described in terms of transmission of data channels such as a PDSCH and a PUSCH, the embodiments of the present invention will be equally applied to transmission of control channels such as an M-PDCCH, a PHICH, and a PUCCH.

E. UE Operation During Discontinuous Transmission/Reception

The present invention proposes the operation of the UE while a data/control channel is transmitted or received through non-consecutive subframes, non-contiguous subframes, or discontinuous subframes (hereinafter, non-consecutive subframes).

While transmitting or receiving the data/control channel through the non-consecutive subframes, the UE may transmit/receive other data/control channels. While the UE receives the DL data/control channel, the UE may attempt to receive other DL data/control channels. While the UE transmits a UL data/control channel, the UE may attempt to receive the DL data/control channel. Alternatively, while the UE transmits the DL data/control channel, the UE may attempt to receive the UL data/control channel.

In consideration of reduction in complexity/cost of the UE, the UE may be implemented/manufactured/configured to perform only one operation among simultaneous transmission and reception, like the operation of the UE in a half duplex (HD)-FDD environment. While the UE performs a similar operation as in the HD-FDD environment, the UE may perform transmission and reception of another data/control channel during transmission or reception of a data/control channel. For example, while the UE transmits a PUSCH bundle, the UE may attempt to receive an M-PDCCH. The UE may repeatedly transmit a PUSCH carrying the same data several times in the time domain. The PUSCH bundle refers to a set of PUSCHs repeatedly transmitted multiple times, a set of subframes in which the PUSCHs are transmitted, or a subframe span in which the PUSCHs are repeatedly transmitted. The UE may attempt to receive the M-PDCCH through a subframe in which the PUSCH is not transmitted during a time duration in which the PUSCH bundle is transmitted.

In the HD-FDD environment, the PUSCH may be repeatedly transmitted in non-consecutive subframes as illustrated in FIG. 11. In this case, the UE may attempt to transmit or receive another data/control channel in a subframe in which the PUSCH is not transmitted. Particularly, the UE may attempt to perform a DL operation, e.g., reception of a DL data/control channel, in a subframe in which the PUSCH is not transmitted.

For example, the UE may monitor the M-PDCCH in a subframe in which the PUSCH is not transmitted. In this case, since the UE should transmit the PUSCH in some subframes, the UE may attempt to receive the M-PDCCH only in the other subframes. In addition, for UL/DL switching, the UE cannot perform reception of the M-PDCCH during a period of time of 1 ms or a time interval of 1 ms at every switching interval from DL to UL or from UL to DL. Therefore, it may be inefficient to receive the DL data/control channel in a subframe in which the PUSCH is not transmitted among subframes of a time duration in which the UE transmits the PUSCH. Accordingly, the present invention proposes the following contents to reduce complexity of the UE and inefficient M-PDCCH monitoring.

The present invention proposes that the MTC UE not receive a DL channel (e.g., an M-PDCCH, a PDSCH, or a PHICH) while transmitting a UL channel (e.g., a PUSCH or a PUCCH) through multiple non-consecutive subframes. For example, the UE may not perform reception of the DL channel in subframes from a subframe in which repetitive transmission of the UL channel is started to a subframe in which repetitive transmission of the UL channel is ended. In other words, even when subframe(s) in which the UL channel is not actually transmitted are present among the subframes from the subframe in which repetitive transmission of the UL channel is started to the subframe in which repetitive transmission of the UL channel is ended, the UE does not perform reception of the DL channel in the subframe(s) without the UL channel. According to this proposal, the UE may assume that the DL channel that the UE is to receive is not transmitted while transmitting the UL channel through multiple non-consecutive subframes.

A duration of subframe(s) in which the UL channel is not transmitted while the MTC UE transmits the UL channel through multiple non-consecutive subframes (e.g., during a duration from a transmissions start subframe to a transmission end subframe) may be determined to be a discontinuous reception (DRX) duration in which DL reception is not performed. This DRX duration is shorter than a long DRX duration and a short DRX duration, configured by a legacy system, and may be a duration in which the UE does not perform DL reception while transmitting the UL channel.

However, if the UE does not receive even a DL RS while repetitive transmission of the UL channel is performed, the UE may be in danger of losing synchronization with a corresponding cell. Therefore, in the present invention, a DL channel that the UE does not attempt to receive during a time duration in which (repetitive) transmission of the UL channel is performed may be limited to data channels (e.g., a PDSCH) and/or control channels (e.g., a PDCCH, an EPDCCH, and an M-PDCCH), except for DL RSs (e.g., an SS, a TRS, a CRS, and a CSI-RS).

It is proposed that, while the MTC UE transmits the UL channel through multiple non-consecutive subframes (e.g., during a duration from a transmission start subframe to a transmission end subframe), the MTC UE not perform transmission and reception of other UL/DL channels. According to this proposal, the UE may assume that a DL/UL channel that the UE should transmit and receive is not transmitted while transmitting the UL channel through the multiple non-consecutive subframes.

A duration of subframe(s) in which the UL channel is not performed while the MTC UE transmits the UL channel through multiple non-consecutive subframes (e.g., during a duration from a transmission start subframe to a transmission end subframe) may be determined to be a DRX duration in which UL transmission and DL reception are not performed. Such a DRX duration is shorter than a long DRX duration and a short DRX duration, configured by a legacy system, and may be a duration in which the UE does not perform UL transmission and DL reception in the time domain in which reception of the DL channel is not performed while transmitting the UL channel.

F. Discontinuous Transmission Subframe

The present invention proposes subframe locations at which data/control channels are transmitted and received through non-consecutive subframes. For convenience of description, although the present invention is described based on transmission of a PUSCH, the contents/spirit of the present invention may also be applied to transmission of a PDSCH and other data/control channels.

Figure 12:
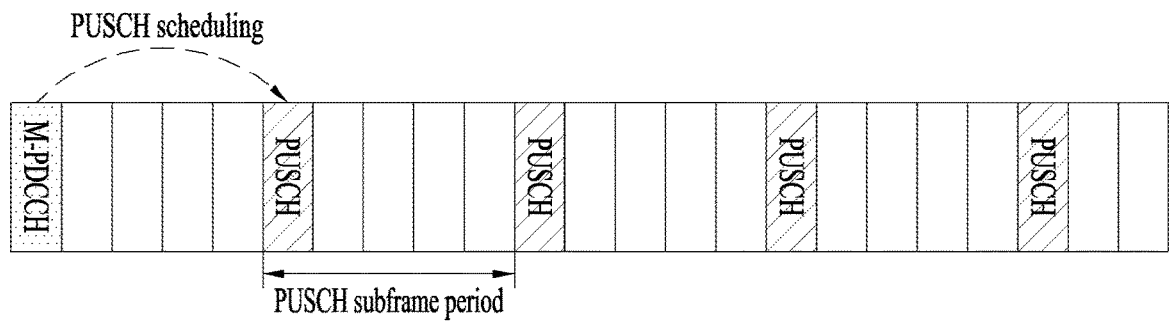
FIG. 12 illustrates an example of a scheduling timing of a UL channel and a transmission timing of the UL channel according to an embodiment of the present invention.

FIG. 12 illustrates an example of a scheduling timing of a UL channel and a transmission timing of the UL channel according to an embodiment of the present invention.

If a PUSCH is scheduled for the UE, the UE should be aware of the location of a subframe in which the PUSCH is transmitted. The present invention proposes transmitting the PUSCH through the following subframes. If a subframe in which an M-PDCCH for scheduling the PUSCH is transmitted is subframe n, the PUSCH may start to be transmitted in subframe n+k. In this case, the PUSCH may be transmitted starting from subframe n+k at a period of P subframes during a duration of D subframes. For example, when the PUSCH is transmitted starting from subframe k at a period of 5 subframes during a duration of one subframe, the UE may transmit the PUSCH in subframe n+k, subframe n+k+5, subframe n+k+10, . . . , as illustrated in FIG. 12. In this case, k is a positive integer other than 0 and may be a predefined value or a value configured by a higher layer. According to any one of the above-described embodiments of the present invention, the M-PDCCH may be repeatedly transmitted. In this case, subframe n is a subframe in which the UE has lastly received the M-PDCCH.

A transmission subframe period value of a PUSCH/PDSCH bundle may be determined as follows.

Option 1. A PUSCH/PDSCH subframe period may be configured (for the UE) by an eNB through an SIB or RRC higher-layer signaling. Characteristically, a different PUSCH subframe period per CE level may be configured.

Option 2. The PUSCH/PDSCH subframe period may be designated to be fixed to a specific value (e.g., 5 ms) (in the standard document). In TDD, referring to Table 1, a minimum of one UL subframe is present among subframes of 10 ms. In consideration of this point, the PUSCH subframe period may be fixed to 10 ms.

Referring to Table 1, a UL subframe is present once every 10 ms or every 5 ms according to TDD UL-DL configuration. Then, the UE/eNB may assume that the PUSCH subframe period is 5 ms in UL-DL configurations 1 and 2 and 10 ms in UL-DL configurations 3, 4, and 5. In UL-DL configuration 6, since there are a UL subframe present per 10 ms and a UL subframe present per 5 ms, the UE and the eNB may assume that 1) the PUSCH subframe period is 10 ms, 2) the PUSCH subframe period is 5 ms and the PUSCH is not scheduled in a UL subframe which is subframe #4 (in a radio frame of 10 ms), or 3) the PUSCH subframe period is 5 ms when transmission of the PUSCH is started in subframe #2, #3, #7, or #8 (in a radio frame of 10 ms) or the PUSCH subframe period is 10 ms when transmission of the PUSCH is started in subframe #4 (in a radio frame of 10 ms).

The PDSCH subframe period may be fixed to a specific value (e.g., 5 ms). In TDD, a minimum period at which a DL subframe periodically appears is 10 ms. In consideration of this point, the PDSCH subframe period may be fixed to 10 ms.

According to TDD UL-DL configuration and subframe index, a DL subframe is present once per 10 ms or per 5 ms. In consideration of this point, the UE/eNB may assume that the PDSCH subframe period is 5 ms in UL-DL configurations 1 and 2 and the PUSCH subframe period is 10 ms in UL-DL configurations 3, 4, 5, and 6. In UL-DL configurations 3, 4, 5, and 6, the DL subframe is present every 5 ms in a specific subframe index and every 10 ms in another specific subframe index. For example, referring to UL-DL configuration 3 of Table 1, subframe 0 is configured as a DL subframe and subframe 5, which is after 5 ms, may be configured again as the DL subframe. Accordingly, it may be said that, in subframe index 0, the DL subframe is present every 5 ms. On the other hand, in UL-DL configuration 3 of Table 1, subframe 7 is configured as a DL subframe but subframe 12 after 5 ms, i.e., subframe 2, is configured as a UL subframe. Therefore, it may be said that, in subframe index 7 of UL-DL configuration 3, the DL subframe is present every 10 ms. In this case, the UE or the eNB may assume, in UL-DL configurations 3, 4, 5, and 6, that 1) the PDSCH subframe period is 10 ms, 2) the PDSCH subframe period is 5 ms and the PDSCH is not scheduled in the locations of subframes in which the DL subframe occurs every 10 ms, or 3) the PDSCH subframe period is 5 ms in subframe indexes in which the DL subframe is present every 5 ms and the PDSCH subframe period is 10 ms in subframe indexes in which the DL subframe is present every 10 ms.

Option 3. Hopping of a repeatedly transmitted PUSCH/PDSCH may be disabled or enabled at a predetermined time period from one frequency to another frequency or from one narrow band to another narrow band. It may be assumed that a transmission subframe period of a PUSCH/PDSCH bundle is the same as a frequency hopping (narrowband hopping) period. Accordingly, if the frequency hopping period is determined, it may be determined that the frequency hopping period is the same as a PUSCH transmission subframe period.

Option 4. The PUSCH/PDSCH subframe period may be indicated through DCI.

Meanwhile, a transmission subframe duration of a PUSCH/PDSCH bundle may be determined as follows.

Option 1. A PUSCH/PDSCH subframe duration value may be configured (for the UE) by the eNB through an SIB or RRC higher-layer signaling.

Option 2. A PUSCH/PDSCH subframe duration may be designated to be fixed to a specific value (e.g., 4 ms) (in the standard document).

Option 3. It may be assumed that the transmission subframe duration of the PUSCH/PDSCH bundle is equal to a subframe duration in which cross-subframe channel estimation can be performed. Therefore, if the subframe duration for cross-subframe channel estimation is determined, it may be determined that the corresponding duration is equal to a PUSCH transmission subframe period. The subframe duration in which the UE or the eNB is capable of performing cross-subframe channel estimation may be equal to a subframe duration in which it may be assumed that the same precoding matrix has been used and/or a subframe duration in which it may be assumed that data has been transmitted in the same PRB (or narrowband).

Option 4. The PUSCH/PDSCH subframe period may be indicated through DCI.

An embodiment of the present invention includes the case in which the above-described embodiments are applied only to an M-PDCCH for a UE using a reduced (system) bandwidth or coverage enhancement and transmission/reception of a PDSCH or a PUSCH scheduled by the M-PDCCH.

According to the embodiments of the present invention, in FDD, the UE may receive a DL channel/signal only within predefined subframes or set subframes, rather than every subframe in a DL frequency band. In TDD, only some subframes among DL subframes according to TDD UL-DL configuration are available for DL reception of the UE. Then, for example, the UE may (repeatedly) receive M-PDCCHs only within subframes available for DL reception and does not expect that the M-PDCCHs will be received in the other subframes. The PDSCH scheduled by the M-PDCCH may be received only within the subframes available for DL reception of the UE. When applying the number of repetitions of the PDSCH, the eNB and the UE may count subframes except for subframes other than the available subframes. The embodiments of the present invention are applied even to subframes which are not configured as a DRX duration. For example, the UE may treat or regard only some subframes, rather than all subframes of a non-DRX duration, as the available subframes for DL reception.

According to the embodiments of the present invention, in FDD, the UE may transmit a UL channel/signal only in predefined subframes or set subframes, rather than every subframe in a UL frequency band. In TDD, only some subframes among UL subframes according to TDD UL-DL configuration are available for UL transmission of the UE. Then, for example, when the UE (repeatedly) receives M-PDCCHs only within subframes available for DL reception (in a DL frequency band), a PUSCH scheduled by the M-PDCCH may be transmitted only within the subframes available for UL transmission of the UE. When applying the number of repetitions of the PUSCH, the UE may count subframes except for subframes other than the available subframes. The embodiments of the present invention are applied even to subframes which are not configured as a DRX duration. For example, the UE may treat or regard only some subframes, rather than all subframes of a non-DRX duration, as the available subframes for UL transmission.

Figure 13:
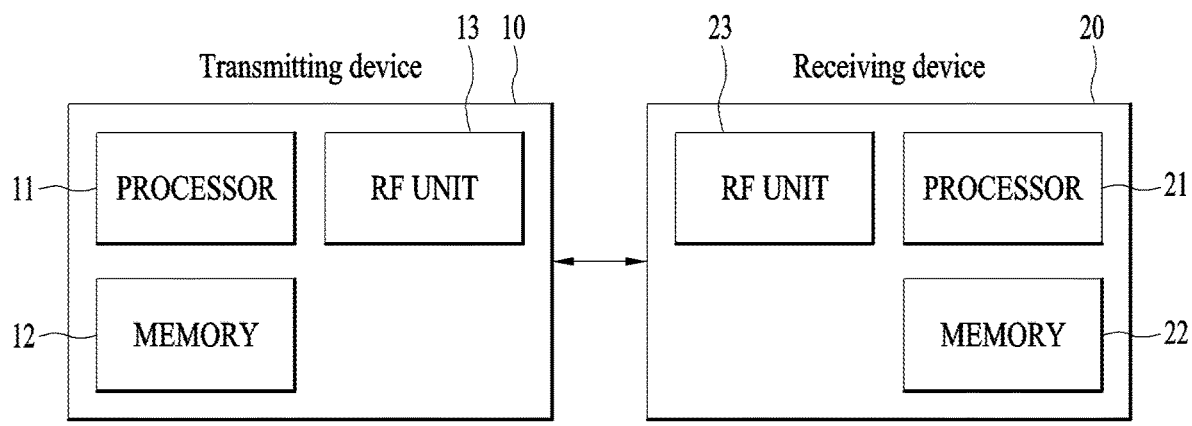
FIG. 13 is a block diagram illustrating elements of a transmitting device 10 and a receiving device 20 for implementing the present invention.

FIG. 13 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor of the present invention may configure subframes available for UL/DL (repetitive) transmission for each CE level or each UE according to any one or a combination of two or more of the embodiments described in Section A to Section F. That is, the eNB processor may configure virtual subframes for a corresponding UE or a corresponding CE level. The subframes available for UL or DL transmission may be previously fixed/defined. The eNB processor may control the eNB RF unit to transmit subframe configuration information about the available subframe(s) to a corresponding UE or UE(s) of a corresponding CE level. The eNB processor may control the eNB RF unit to (repeatedly) transmit or receive a control/data channel within the subframes available for the UE according to the subframe configuration information or previously fixed/defined subframe configuration. The eNB processor may control the eNB RF unit to transmit information about the number of times that the eNB is to transmit a DL channel carrying the same DL information/data (i.e., the number of DL repetitions) and/or the number of times that the UE should transmit a UL channel carrying the same UL information/data. The eNB processor may control the eNB RF unit to transmit a DL channel within the available (consecutive virtual) subframes (by the number of DL repetitions). The eNB processor may control the eNB RF unit to receive a UL channel within the available (consecutive virtual) subframes (by the number of UL repetitions). The eNB processor may control the eNB RF unit not to transmit the DL channel from a transmission start subframe to a transmission end subframe of the UL channel.

The UE processor of the present invention may control the UE RF unit to receive subframe configuration information indicating subframes available for UL/DL repetitive transmission for each CE level or each UE according to any one or a combination of two or more of the embodiments described in Section A to Section F. The UE processor may control the UE RF unit to (repeatedly) transmit or receive a control/data channel within the subframes available for the UE according to the subframe configuration information or previously fixed/defined subframe configuration. The UE processor may control the UE RF unit to receive information about the number of times that the eNB is to transmit a DL channel carrying the same DL information/data (i.e., the number of DL repetitions) and/or the number of times that the UE should transmit a UL channel carrying the same UL information/data. The UE processor may control the UE RF unit to receive a DL channel within the available (consecutive virtual) subframes (by the number of DL repetitions). The UE processor may control the UE RF unit to transmit a UL channel within the available (consecutive virtual) subframes (by the number of UL repetitions). The UE processor may control the UE RF unit not to attempt to receive the DL channel from a transmission start subframe to a transmission end subframe of the UL channel. That is, the UE processor may be configured not to monitor the DL channel of from the transmission start subframe to the transmission end subframe of the UL channel.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

What is claimed are:

1. A method of receiving a downlink (DL) signal by a user equipment (UE) in a wireless communication system, the method comprising:
   receiving DL subframe information regarding first subframes available for DL transmissions for the UE among DL subframes of a frequency band, where the first subframes are part of the DL subframes of the frequency band;
   receiving a physical downlink control channel (PDCCH) for the UE on the frequency band; and
   repeatedly receiving a physical downlink shared channel (PDSCH) on the frequency band based on the PDCCH,
   wherein the PDCCH is repeatedly received on the frequency band,
   wherein each of the repeatedly received PDCCH and PDSCH is repeated only within the first subframes on the frequency band,
   wherein the repeatedly received PDSCH is present within subframes other than subframes including the repeatedly received PDCCH among the first subframes, and
   wherein the first subframes occur by Y subframes with a periodicity of X subframes, where Y and X are positive integer values determined based on the DL subframe information, and X is greater than Y.

2. The method of claim 1, wherein the PDCCH is not received while the UE transmits uplink (UL) channels.

3. The method of claim 1, wherein the first subframes are specific to a coverage enhancement level of the UE.

4. The method of claim 1, wherein the frequency band has a limited bandwidth including only one resource block in a frequency domain.

5. A user equipment (UE) for receiving a downlink (DL) signal in a wireless communication system, the UE comprising:
   a transmitter and a receiver; and
   a processor; and
   a computer memory storing at least one program which, when executed, causes the processor to perform operations comprising:
   receiving, via the receiver, DL subframe information regarding first subframes available for DL transmissions for the UE among DL subframes of a frequency band, where the first subframes are part of the DL subframes of the frequency band;
   receiving, via the receiver, a physical downlink control channel (PDCCH) for the UE on the frequency band; and
   repeatedly receiving, via the receiver, a physical downlink shared channel (PDSCH) on the frequency band based on the PDCCH,
   wherein the PDCCH is repeatedly received on the frequency band,
   wherein each of the repeatedly received PDCCH and PDSCH is present only within the first subframes on the frequency band,
   wherein the repeatedly received PDSCH is present within subframes other than subframes including the repeatedly received PDCCH among the first subframes, and
   wherein the first subframes occur by Y subframes with a periodicity of X subframes, where Y and X are positive integer values determined based on the DL subframe information, and X is greater than Y.

6. The UE of claim 5, wherein the PDCCH is not received while the UE transmits uplink (UL) channels.

7. The UE of claim 5, wherein the first subframes are specific to a coverage enhancement level of the UE.

8. The UE of claim 5, wherein the frequency band has a limited bandwidth including only one resource block in a frequency domain.

9. A method of transmitting a downlink (DL) signal by a base station (BS) in a wireless communication system, the method comprising:
   transmitting DL subframe information regarding first subframes available for DL transmissions for a user equipment (UE) among DL subframes of a frequency band, where the first subframes are part of the DL subframes of the frequency band;
   transmitting a physical downlink control channel (PDCCH) for the UE on the frequency band; and
   repeatedly transmitting a physical downlink shared channel (PDSCH) on the frequency band based on the PDCCH,
   wherein the PDCCH is repeatedly transmitted on the frequency band,
   wherein each of the repeatedly transmitted PDCCH and PDSCH is present only within the first subframes on the frequency band,
   wherein the repeatedly transmitted PDSCH is present within subframes other than subframes including the repeatedly transmitted PDCCH among the first subframes, and
   wherein the first subframes occur by Y subframes with a periodicity of X subframes, where Y and X are positive integer values determined based on the DL subframe information, and X is greater than Y.

10. The method of claim 9, wherein the first subframes are specific to a coverage enhancement level of the UE.

11. The method of claim 9, wherein the frequency band has a limited bandwidth including using only one resource block in a frequency domain.

12. A base station (BS) for transmitting a downlink (DL) signal in a wireless communication system, the BS comprising:
   a transmitter and a receiver,
   a processor;
   a computer memory storing at least one program which, when executed, causes the processor to perform operations comprising:
   transmitting, via the transmitter, DL subframe information regarding first subframes available for DL transmissions for a user equipment (UE) among DL subframes of a frequency band, where the first subframes are part of the DL subframes of the frequency band;
   transmitting, via the transmitter, a physical downlink control channel (PDCCH) for the UE on the frequency band; and
   repeatedly transmitting, via the transmitter, a physical downlink shared channel (PDSCH) on the frequency band based on the repeatedly received PDCCH,
   wherein the PDCCH is repeatedly transmitted on the frequency band, wherein each of the repeatedly transmitted PDCCH and PDSCH is present only within the first subframes on the frequency band, wherein the repeatedly transmitted PDSCH is present within subframes other than subframes including the repeatedly transmitted PDCCH among the first subframes, and wherein the first subframes occur by Y subframes with a periodicity of X subframes, where Y and X are positive integer values determined based on the DL subframe information, and X is greater than Y.

13. The BS of claim 12, wherein the first subframes are specific to a coverage enhancement level of the UE.

14. The BS of claim 12, wherein the frequency band has a limited bandwidth including only one resource block in a frequency domain.

* * * * *